(12) United States Patent
Indrakumar

(10) Patent No.: US 11,928,704 B2
(45) Date of Patent: Mar. 12, 2024

(54) SYSTEM AND METHOD FOR DIGITAL COUPON DELIVERY

(71) Applicant: Kuppam Indrakumar, Las Vegas, NV (US)

(72) Inventor: Kuppam Indrakumar, Las Vegas, NV (US)

(*) Notice: Subject to any disclaimer, the term of this patent is extended or adjusted under 35 U.S.C. 154(b) by 19 days.

(21) Appl. No.: 17/714,156

(22) Filed: Apr. 6, 2022

(65) Prior Publication Data

US 2023/0325868 A1 Oct. 12, 2023

(51) Int. Cl.
*G06Q 30/00* (2023.01)
*G06Q 30/0238* (2023.01)

(52) U.S. Cl.
CPC .............................. *G06Q 30/0238* (2013.01)

(58) Field of Classification Search
None
See application file for complete search history.

(56) References Cited

U.S. PATENT DOCUMENTS

| | | | |
|---|---|---|---|
| 2007/0174259 A1* | 7/2007 | Amjadi | G06Q 30/0207 |
| 2013/0311328 A1* | 11/2013 | Chien | G06Q 30/0207 |
| | | | 705/26.9 |
| 2015/0254704 A1* | 9/2015 | Kothe | G06Q 30/0225 |
| | | | 705/14.26 |
| 2019/0213626 A1* | 7/2019 | Khoyilar | G06F 16/144 |

* cited by examiner

*Primary Examiner* — Meredith A Long
(74) *Attorney, Agent, or Firm* — Bayramoglu Law Offices LLC

(57) ABSTRACT

A system and a method for delivering digital coupons to customers. A coupon delivery server is designed to manage coupons for displaying to users. The server provides a first user interface for an administrator to manage merchants of the system, provides a second user interface for merchants to customize coupons to be advertised, assigns a scannable code for each coupon, arrange coupons into a list, and display the list of coupons with assigned scannable codes on a display. When a user scans a code from the display via a mobile device, the user is presented a list of merchants, and when the user selects a particular merchant, relative scannable coupons are displayed on the mobile device, the user can then bring the scannable coupon to a point of sale of the selected merchant for automatically redemption of a discount to a purchase of the user.

20 Claims, 8 Drawing Sheets

Merchant Portal
(Shows Add Coupons View)

SYSTEM AND METHOD FOR DIGITAL COUPON DELIVERY

TECHNICAL FIELD

This instant invention relates to the field of digital coupon delivery, and more particularly to a system for delivering digital coupons to customers and a method of the same.

BACKGROUND

Coupons have been used as a marketing tool to boost sales. Merchants issue coupons to attract customers to their store or website by providing discounts or incentives to their products or services. Customers collect coupons for potential best deals on a particular product or service. Most coupons describe a redeemable value, a redeemable store or website, an expiration date, and convey messages from the merchants to customers.

Conventionally, coupons are distributed to customers by advertising campaigns via mail, posters, handouts, cards, booklets, emails, and online social networking platforms, etc. Based on the target of the campaigns, coupons may be delivered to a chosen group of customers based on, but is not limited to, customer's physical geolocation location, customer's recent visit of websites or physical stores, customer's recent search terms, customer's click on certain advertisements, or customer's social networking profiles such as gender, age, marriage status, interest, and income, etc.

However, as larger adoption of coupons by companies in marketing, customers start to receive a large number of coupons that they may or may not be interested in. This results in difficulties for merchants to reach their potential customers and difficulties for customers to find certain coupons that they desire. Further, resources are wasted due to a large number of the distributed coupons may not actually be used by the received customers. To be more specific, papers are wasted for printing unused coupons, and computer server resources are also wasted for delivering a large number of non-interested digital coupons to customers.

Hence, there is a need to increase the efficiency and accuracy of coupon delivery. If coupons can be shown to a large number of customers but only delivered to those who would actually use them, this can substantially decrease the waste of resources on printing and delivering coupons and at the same time achieve the advertising purpose. On the customers' side, if customers can only receive coupons of their desire, this would eliminate the time that the customers needed for sorting out the received coupons.

SUMMARY

In this respect, before explaining at least one embodiment in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

One purpose of the instant invention is to provide a system and a method for delivering digital coupons to only those customers that would need the coupons, and at the same time achieving the advertisement purpose by maintaining exposure of all available coupons to the public. This solves the aforementioned problems in the conventional coupon delivery system wherein a large amount of paper is wasted in printing coupons that would never be used and time is wasted by coupon receivers in sorting out their desired coupons.

Another purpose of the instant invention is to provide improvement to the conventional coupon delivery system by allowing merchants to instantly modify their providing coupons. Specifically, the instant invention allows merchants to digitally add new coupons, edit existing coupons, and remove coupons that the merchants would like the distribution to stop. These actions of the merchants on coupons would instantly cause the coupon delivery system to modify its digital distribution of the coupons, which enables the merchants an ability to instant control of their coupon delivery, thereby allowing the merchants to quickly adjust their marketing strategies. This also allows users to see instant changes of particular coupons.

In one aspect of the instant invention, currently available digital coupons are displayed with scannable codes in a public kiosk where customers can obtain their desired coupons by scanning the scannable codes via their mobile devices. In one embodiment of the instant invention, a universal scannable code is presented to customers either digitally or as a printed version, and the currently available digital coupons are displayed in the customers mobile devices after the customers scan the universal scannable code. The universal scannable code can be presented in a variety of medium including, but not limited to, a printed poster, television, handouts, cards, mail, emails, and public displays.

After customers obtain their desired coupons in their mobile devices, the customers can further show the coupons in their mobile devices at a point of sales of the merchants. The point of sale can further scan the desired coupons of the customers from their mobile devices and have discounts or rebates automatically applied to the customers' purchasing goods or services.

Furthermore, the system and method of the instant invention allows the merchants to view their budget spent on each coupon, a total budget spent on all coupons, a number of coupon delivery for each coupon, and a total number of coupon delivery, within a predetermined time period. Also, the system and method of the instant invention further allows the merchants to pay for the coupon delivery service in the same coupon management portal, which provides an easy payment tunnel for the merchants to take care of their coupon delivery expenses, thereby simplifies marketing budget planning processes of the merchants.

BRIEF DESCRIPTION OF THE DRAWINGS

In the drawings, various embodiments of the present systems and methods are illustrated by way of example. It is to be expressly understood that the description and drawings are only for the purpose of illustration.

DETAILED DESCRIPTION

A system and a method for efficiently and accurately delivering coupons to users are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement.

Figure 1:
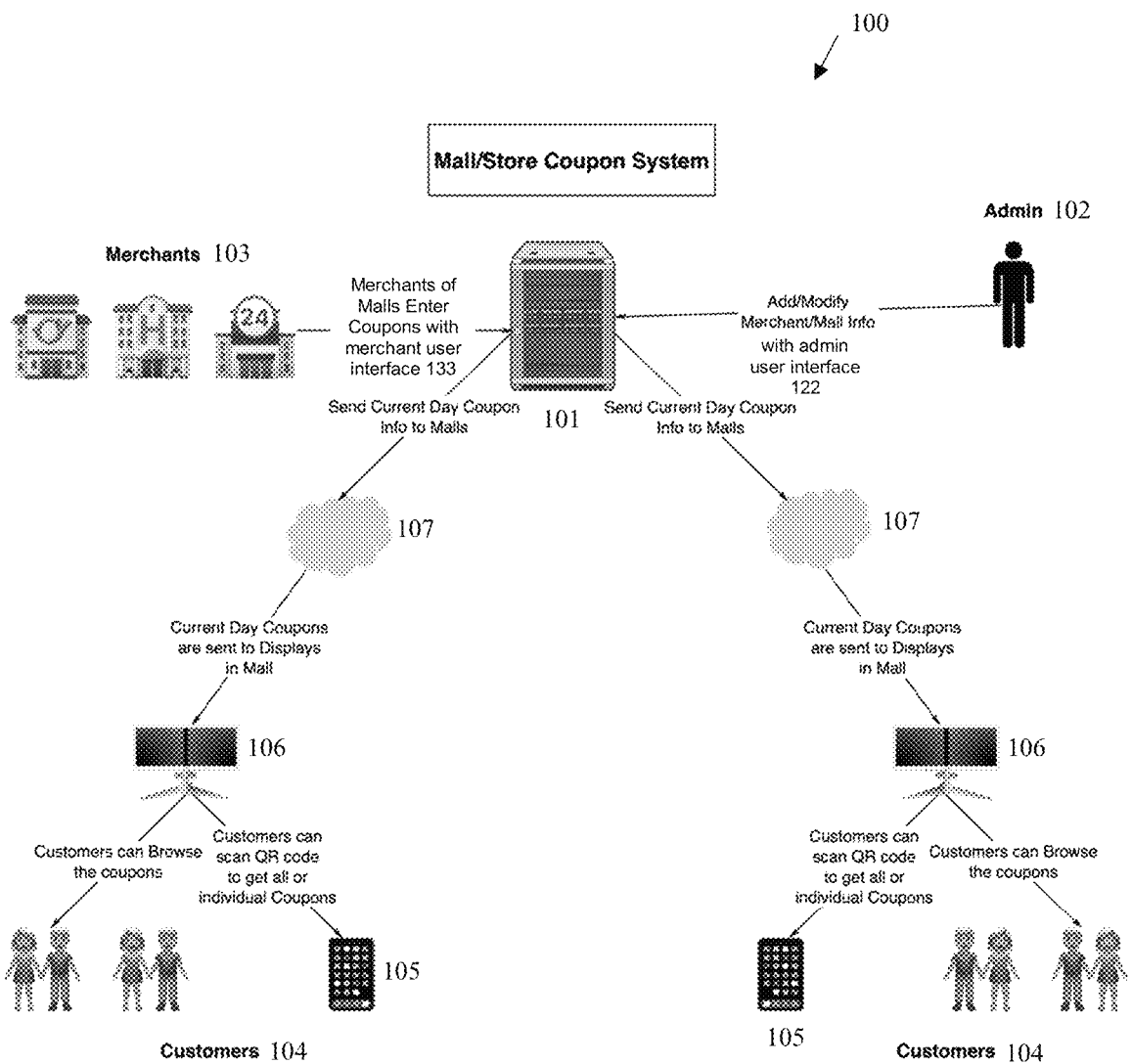
FIG. 1 illustrates a coupon delivery system of the instant invention wherein the coupon delivery system includes at least one coupon kiosk.

FIG. 1 illustrates one embodiment of the instant invention that the coupon delivery system 100 includes a coupon delivery server 101, an administrator 102, a plurality of merchants 103, a plurality of customers 104, a plurality of mobile devices 105, at least one display 106, and at least one network 107.

The coupon delivery server 101 provides an admin user interface 122 for an administrator 102 of the system to manage merchants 103 of the system. The admin user interface 122 allows the administrator 102 to add a new merchant 103, delete an existing merchant 103, edit merchant information of a merchant 103 including setting a brand logo for the merchant 103, manage coupons provided by a merchant 103, issue a login credential of a merchant 103, issue invoices to a merchant 103, receive payment from a merchant 103, and setting how the coupon list is updated.

Figure 3:
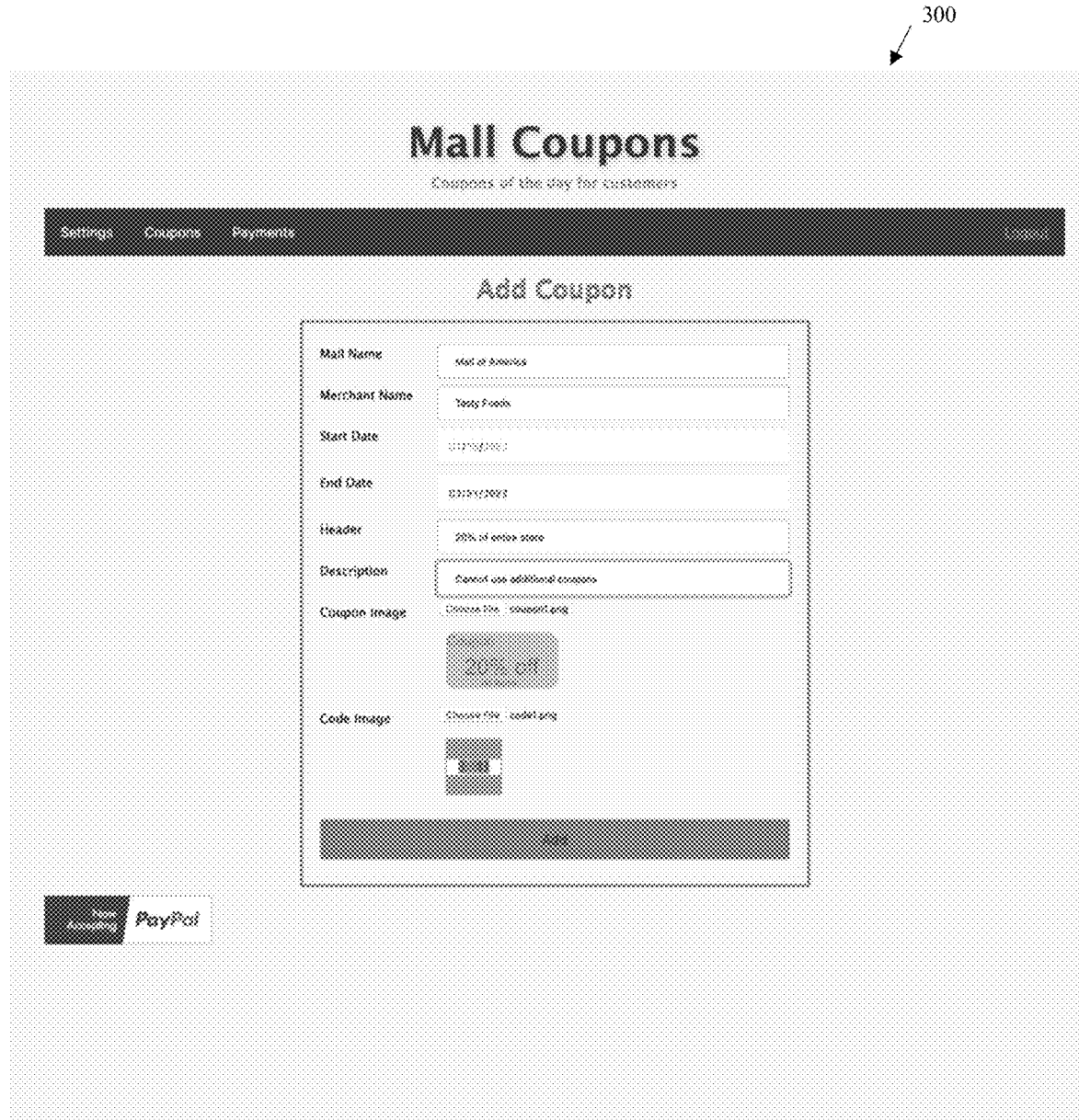
FIG. 3 illustrates a first page of a merchant portal for the merchants to add coupons into the coupon delivery system.
Figure 4:
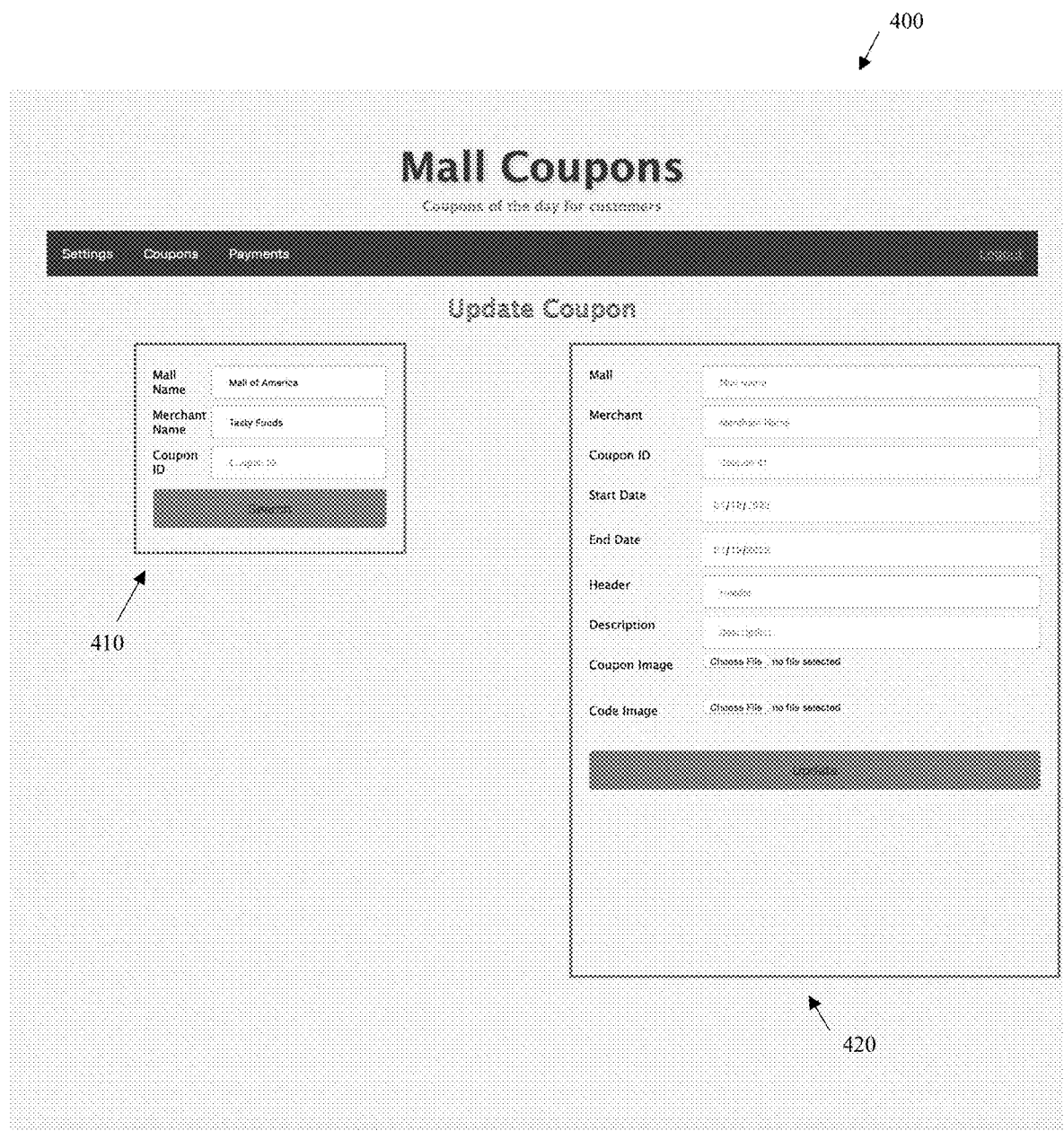
FIG. 4 illustrates a second page of the merchant portal for the merchants to edit and update existing coupons in the coupon delivery system.
Figure 5:
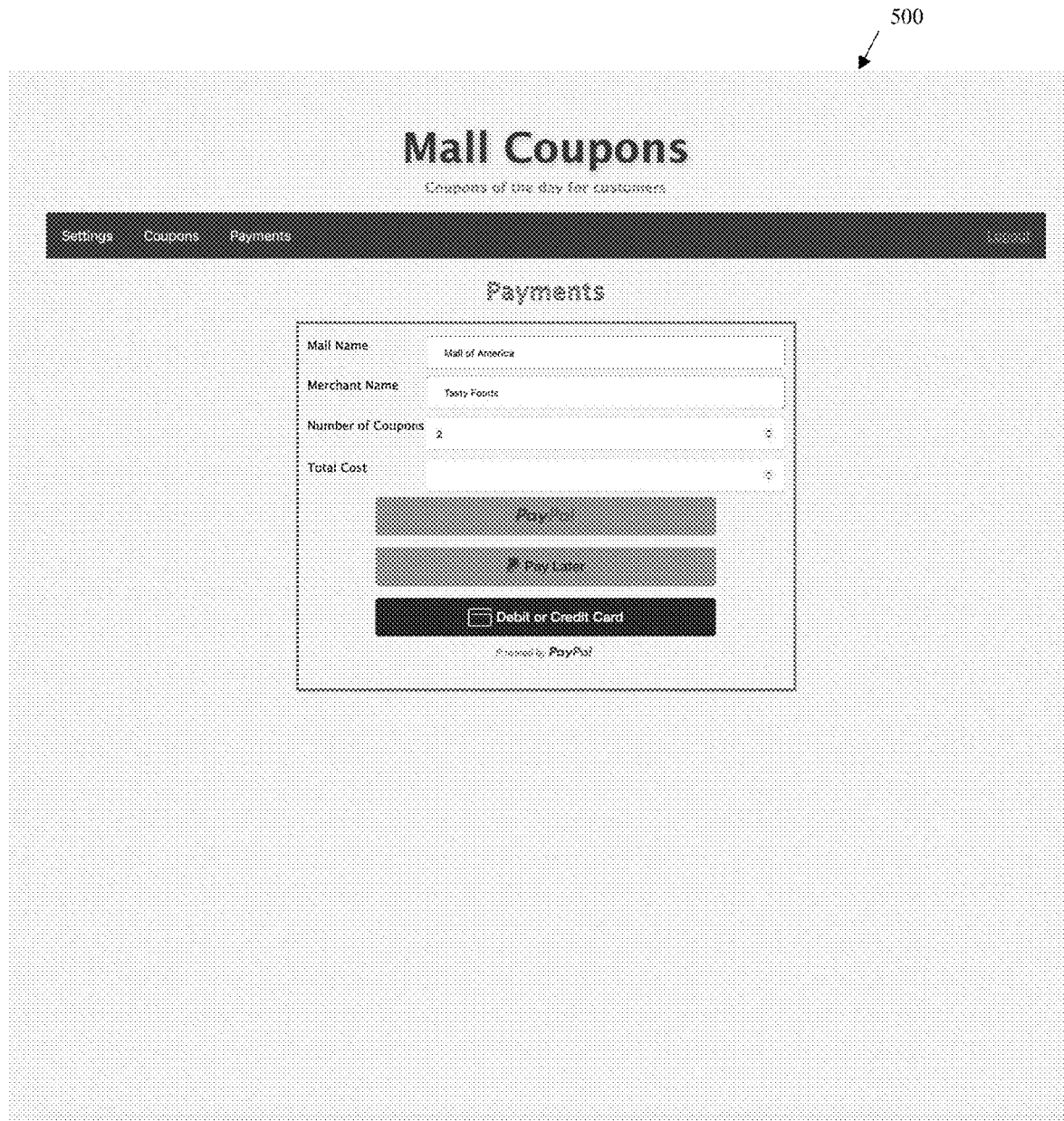
FIG. 5 illustrates a third page of the merchant portal for the merchants to issue payments in the coupon delivery system.

The coupon delivery server 101 further provides a merchant user interface 133 for merchants 103 to customize coupons to be provided by the merchants 103. The merchant user interface 133 authenticates each merchant login with login credentials issued by the admin user interface. For example, after the administrator 102 issue a login credential of a merchant 103 through the admin user interface 122, the login credential is stored at a memory of the coupon delivery server 101, and when a merchant login into the coupon delivery system 100 through the merchant user interface 133, a login information entered by the merchant is compared to the stored login credential. FIGS. 3-5 illustrates exemplary views of the merchant interface. As shown in FIG. 3, the merchant user interface 300 allows a merchant to add a coupon, including setting location information of the coupon, setting merchant information of the coupon, designating a start date and an end date of the coupon, setting a header of the coupon, setting a description of the coupon, uploading an image of the coupon, and uploading an image of the scannable code of the coupon. The uploaded image of the scannable code of the coupon includes, but is not limited to, an image of a bar code and an image of a quick response (QR) code or any equivalent code. In one embodiment, the location information of the coupon includes a mall name, and the merchant information of the coupon includes a merchant name. After each new coupon is added, the merchant user interface 300 automatically generates and assigns a coupon identification (ID) for the newly added coupon.

FIG. 4 illustrates another page of the merchant user interface 400 that provides a search window 410 for allowing a merchant to search for an existing coupon based on the location information of the coupon, merchant information of the coupon, and the coupon ID of the coupon. After a merchant submits a search query through the search window 410, the coupon delivery server 101 uses the location information, merchant information, and the coupon ID entered by the merchant to find a matched coupon from all coupons provided by the merchant. When a match is found, detailed information of the matched coupon is displayed in result window 420. The merchant can further edit the coupon in result window 420, including editing location information of the coupon, editing merchant information of the coupon, editing a start date and an end date of the coupon, editing a header of the coupon, editing a description of the coupon, uploading an image of the coupon, and uploading an image of the scannable code of the coupon.

FIG. 5 illustrates a payment page of the merchant user interface 500 that allows a merchant to pay for charges from the coupon delivery system. Here, the merchant can select a number of coupons that the merchant is paying for in its delivery service and a total cost of which the merchant is paying. In one embodiment, the merchant can type in the number of coupons in which the merchant is paying for the delivery services. In another embodiment, the number of coupons can be selected from a dropdown menu showing number 1 to the maximum number of coupons that the merchant has provided, thereby enabling the merchant to pay services fees in parts or in full.

Referring to FIG. 1, the coupon delivery server 101 is further configured to assigning a scannable code for each coupon. In one embodiment, the scannable code to be assigned to each coupon that is uploaded to the coupon delivery server 101 by the corresponding merchant 103 through the merchant user interface 133. In another embodiment, when the merchant 103 does not upload a scannable code, the coupon delivery server 101 will prompt the merchant to select a type of a scannable code from a dropdown menu in a pop-up window, and automatically generate a scannable code for the corresponding coupon based on the merchant's selection of the type of scannable code. The type of scannable code includes, but is not limited to, a bar code and a quick response (QR) code or any equivalent code.

The coupon delivery server 101 is also configured to arrange coupons with assigned scannable codes into a list. The coupons can be arranged based on an alphabetical order of the merchants' name, an order of the start dates of the coupons, an order of the end dates of the coupons, discount amount of the coupons, and a random arrangement. In one embodiment, the list of coupons is updated instantly (i.e. updated within 10 seconds) when a change (i.e. add, edit, or remove) of a coupon is submitted to the coupon delivery server 101. In another embodiment, the list is updated periodically wherein the coupon delivery server 101 does not instantly update the list upon a change of a coupon, but instead update the list according to a predetermined schedule such as update in every 30 seconds, every 1 minute, or every 10 minutes.

The coupon delivery server 101 is connected to at least one network 107. The network 107 includes, but is not limited to, a local area network (LAN), a wireless local area network (WLAN), and wide area network (WAN) such as the Internet. As illustrated in FIG. 1, the coupon delivery server 101 connects with at least one display 106. The at least one display 106 includes, but is not limited to, a television, a digital banner, and a public kiosk. In one embodiment, the coupon delivery server 101 connects to multiple displays 106 through multiple different networks 107.

Figure 6:
FIG. 6 illustrates a user interface of a coupon kiosk displaying a variety of stores with their brand logo, primary coupons, and quick response (QR) codes.

The coupon delivery server 101 transmits the list of coupons to the at least one display 106 and causes the at least one display 106 to display the list of coupons. FIG. 6 illustrates an exemplary display of the list of coupons. As shown in FIG. 6, each coupon display includes a brand logo of the coupon, the image of the coupon, and the corresponding image of the scannable code of the coupon. When the coupon list is too long to fit into the display, the display will automatically split the coupon list into multiple pages, and repeatedly display each page one at a time at a predetermined speed such as every 5 seconds, every 10 seconds, or every 20 seconds. The at least one display is placed at a public accessible area to attract customers. The public accessible area includes, but is not limited to, malls, outlets, stores, restaurants, airports, hotels, and resorts, etc.

The coupon delivery server 101 includes at least one processor and at least one memory storing computer readable instructions, and when the computer readable instructions are executed by the at least one processor, cause the coupon deliver server 101 to perform the disclosed functions.

Figure 7:
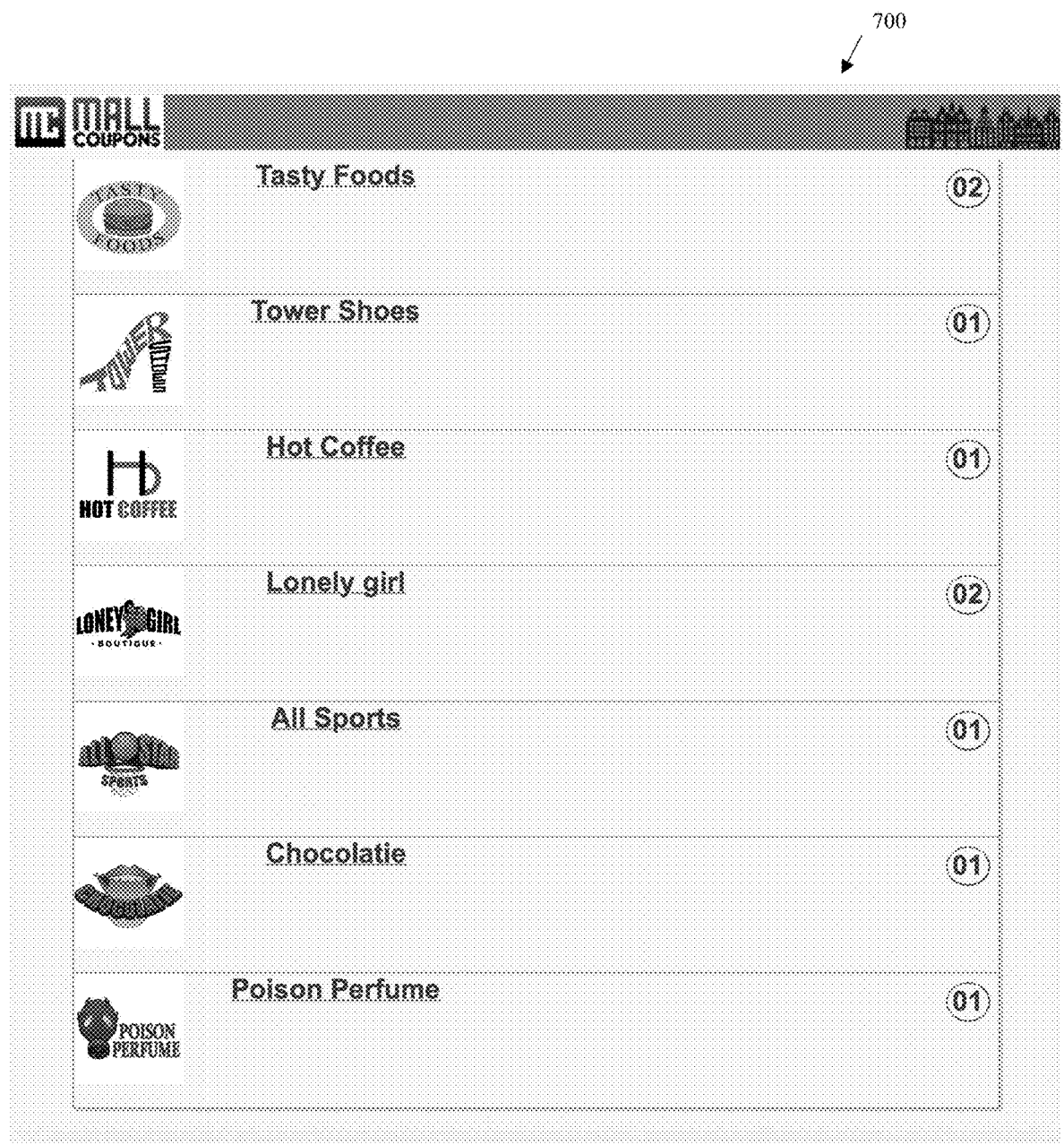
FIG. 7 illustrates a user interface of a user's mobile device displaying a list of merchants to the user.
Figure 8:
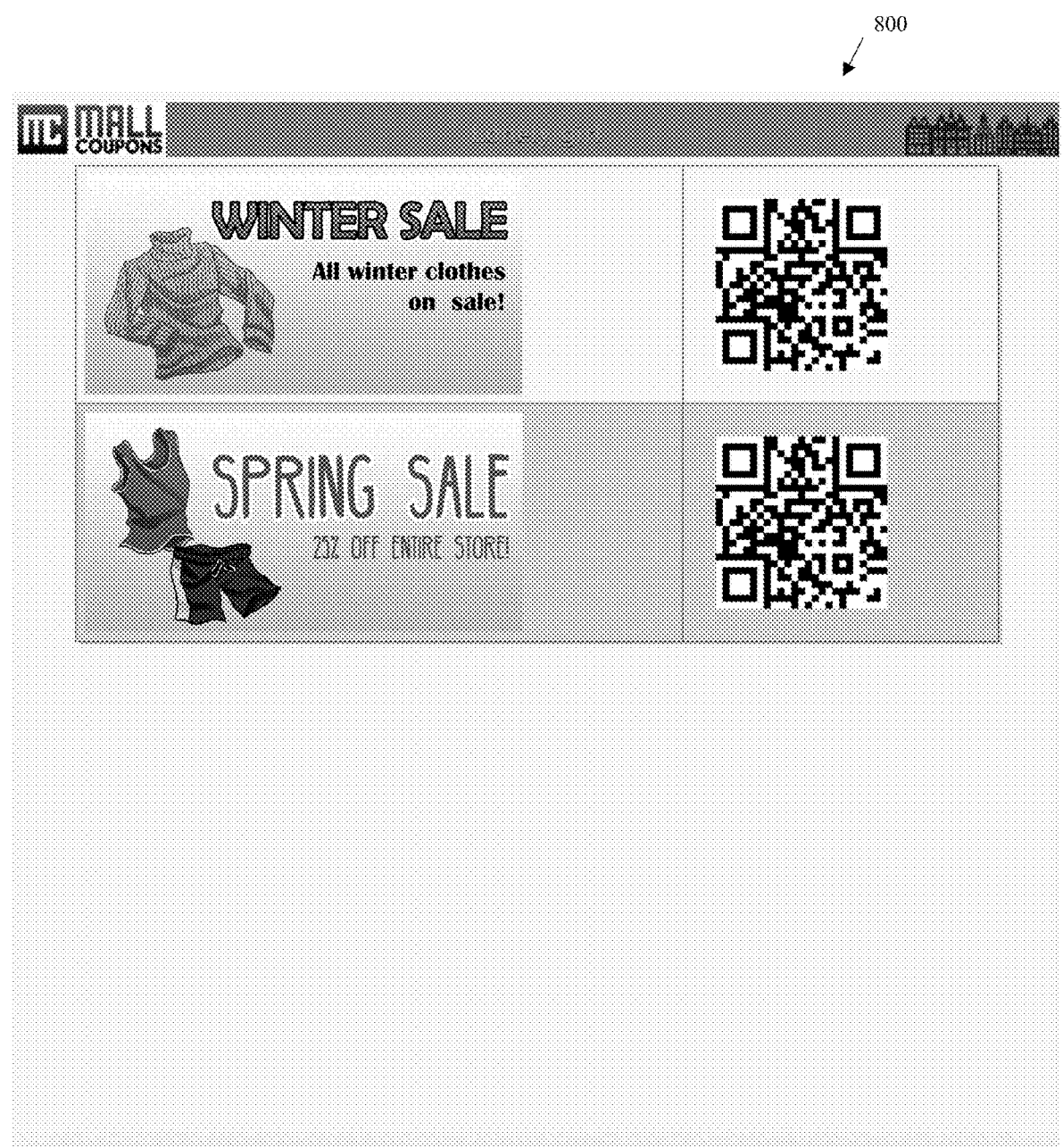
FIG. 8 illustrates a screenshot of the user's mobile device after the user selects one of the merchants from FIG. 7.

Further referring to FIG. 1, a plurality of customers 104 in proximity to the at least one displays 106, when attracted by the displayed coupon list, can use their own mobile devices 105 to scan a displayed scannable code. The scanning of the displayed scannable code as shown in FIG. 6 will cause a browser of the user device to navigate to a webpage showing a list of merchants together with a number of available coupons of each merchant. FIG. 7 illustrates an exemplary webpage showing such list on a mobile device 105 to a customer 104. As shown in FIG. 7, each merchant is listed with their brand name and their brand logo, together with a number of currently available coupons of the merchant. Also, sale end date, best coupon and description of the merchant can be shown within the illustrated exemplary webpage of FIG. 7. And, the customer 104 can further select one of the listed merchants on the mobile device 105 to get coupon details of the particular merchant. FIG. 8 illustrates an exemplary webpage displaying, on a mobile device 105, coupon details of a particular merchant selected by a customer 104. As shown in FIG. 8, the customer 104 can further take the mobile device 105 to a point of sale of the selected merchant and have a coupon scanned at the point of sale for automatically applying a discount or a rebate to a purchase of the customer 104 and further causing the inventory of the purchased goods or services to be automatically deducted.

Figure 2:
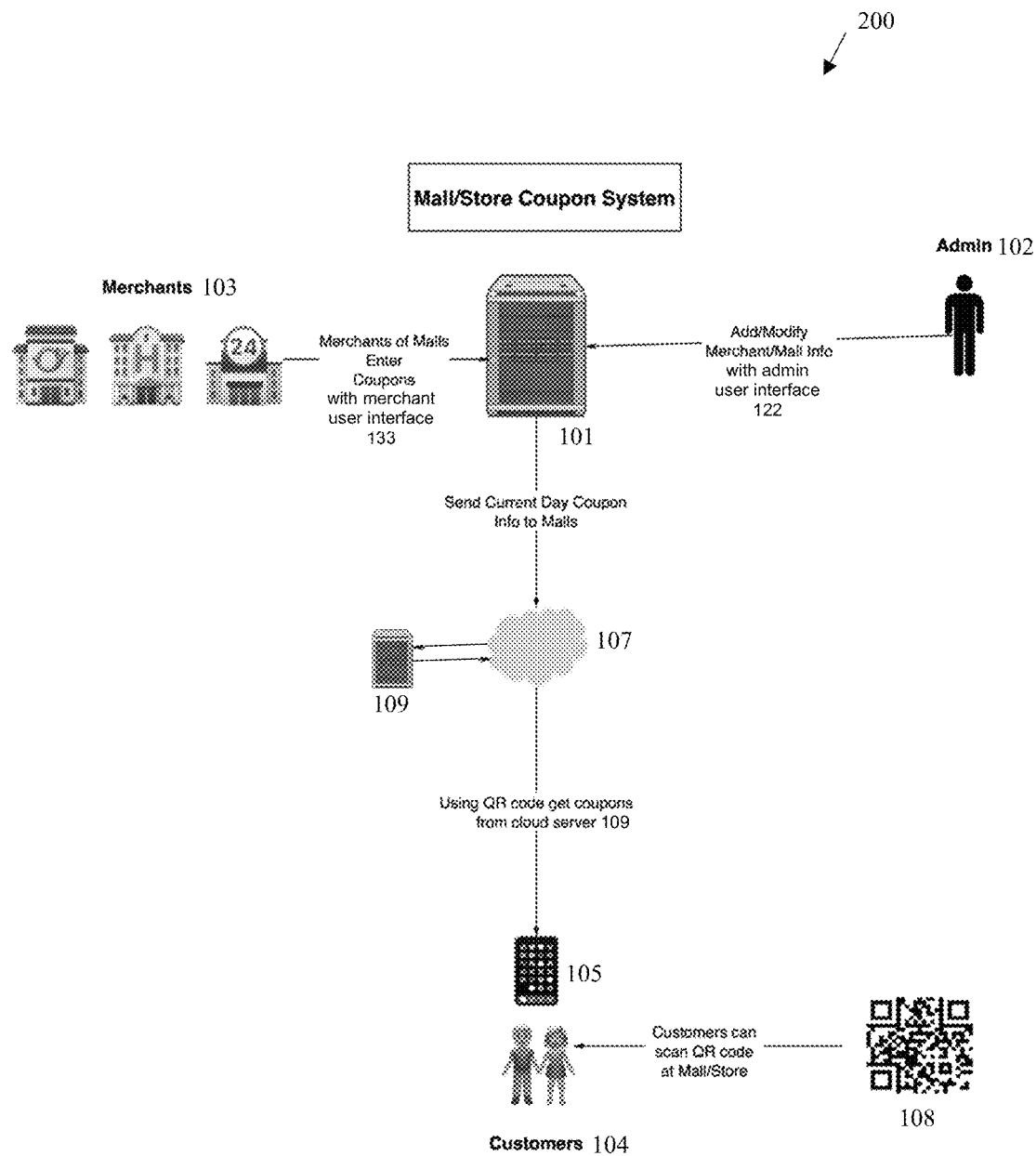
FIG. 2 illustrates another implementation of the disclosed coupon delivery system wherein coupon kiosks are not used in the system.

FIG. 2 illustrates another embodiment of the instant invention wherein the coupon delivery system does not include any public kiosk nor any public electronic display. In this embodiment, the coupon delivery system 200 includes a coupon delivery server 101, and instead of transmitting a coupon list to a display, the coupon delivery server 101 transmits the coupon list to a cloud server 109 in the network 107. A fixed universal scannable code is presented to customers 104. Customers 104 can scan the universal scannable code with their mobile devices 105 and cause a browser of the user device to navigate to a webpage showing a list of merchants together with a number of available coupons of each merchant. As discussed above in FIGS. 7-8, the customer 104 can further obtain a scannable code 108 of a particular coupon on the mobile device 105 and take the mobile device 105 to a point of sale of the selected merchant and have the coupon 108 scanned at the point of sale for automatically applying a discount or a rebate to a purchase of the customer 104.

The plurality of mobile devices 105 may be, for example, a smartphone, tablet, PDA, or smartwatch having a processor, computer readable media that stores software and application programs for execution by the processor, a camera for scanning scannable codes, and a wireless communication interface for accessing a webpage on the Internet.

The term "computer-readable media" or "computer-readable medium" as used herein refers to any media/medium that participates in providing instructions to the processor for execution. Such a medium may take many forms, including but not limited to non-volatile media, volatile media, and transmission media. Non-volatile media may include, for example, optical or magnetic disks. Volatile media may include a dynamic memory. Transmission media may include coaxial cables, copper wire and fiber optics. Transmission media may also take the form of acoustic, optical, or electromagnetic waves, such as those generated during Radio Frequency (RF) and infrared (IR) data communications. Common forms of computer-readable media may include, for example, a floppy disk, a flexible disk, hard disk, magnetic tape, any other magnetic medium, a CD-ROM, a Compact Disc-Rewritable (CDRW), a Digital Video Disk (DVD), any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Those of skill in the art will appreciate that the herein described systems and methods may be subject to various modifications and alternative constructions. There is no intention to limit the scope of the invention to the specific constructions described herein. Rather, the herein described systems and methods are intended to cover all modifications, alternative constructions, and equivalents falling within the scope and spirit of the invention and its equivalents.

What is claimed is:

1. A coupon delivery system, comprises:
 a server to manage coupons for displaying to users, the server includes a processor and a memory, wherein the memory stores computer instructions, and when the computer instructions are executed by the processor, cause the server to perform following functions:
 providing a first user interface for an administrator of the system to allow the administrator to manage merchants of the system;
 providing a second user interface for merchants to customize coupons to be provided by the merchants;
 assigning a respective scannable code for each coupon provided by merchants;
 arranging coupons with the assigned scannable codes in to a list;
 transmitting the list of coupons with the assigned scannable codes for display; and
 providing a first scannable code of the assigned scannable codes configured to be scanned by a user device;
 wherein the first scannable code is configured to redirect a browser of the user device to a webpage showing a list of different merchants together with a number of available coupons of each merchant of the list of different merchants when the first scannable code is scanned by the user device;
 wherein each merchant on the list of different merchants on the webpage is configured to be selected by a user of the user device and cause the browser to display at least one available coupon of a selected merchant with at least one second scannable code on the user device when selected by the user of the user device; and wherein the at least one second scannable code is configured to be scanned at a point of sale of the selected merchant for automatically applying a discount to a purchase of the user; and a public electronic display in communication with the server configured to receive the list of coupons with the assigned scannable codes from the server, the public electronic display comprising a first display configured to display the list of coupons and to display the assigned scannable codes, including the first scannable code, transmitted by the server with the list of coupons, wherein scanning, by the user device, the first scannable code, which demarcates one merchant of the list of different merchants on the first display of the public electronic display, causes the browser of the user device to navigate to the webpage to display on the user device the list of different merchants together with the number of available coupons of each merchant of the list of different merchants.

2. The coupon delivery system according to claim 1, wherein the first user interface allows the administrator to add a new merchant, delete an existing merchant, edit merchant information of a merchant, manage coupons provided by a merchant, issue a login credential of a merchant, issue invoices to a merchant, receive payment from a merchant, and set how the coupon list is updated.

3. The coupon delivery system according to claim 2, wherein the second user interface authenticates each merchant login with login credentials issued by the first user interface.

4. The coupon delivery system according to claim 1, wherein the second user interface further allows a merchant to add a coupon, including at least one of: setting location information of the coupon, setting merchant information of the coupon, designating a start date and an end date of the coupon, setting a header of the coupon, setting a description of the coupon, uploading an image of the coupon, and uploading an image of the scannable code of the coupon.

5. The coupon delivery system according to claim 4, wherein the location information of the coupon includes a mall name, and the merchant information of the coupon includes a merchant name.

6. The coupon delivery system according to claim 4, further comprising a function to automatically generate and assign a coupon identification (ID) for each coupon added into the system.

7. The coupon delivery system according to claim 1, wherein the second user interface allows a merchant to:
search for an existing coupon based on the location information of the coupon, merchant information of the coupon, and a coupon identification (ID) of the coupon;
edit an existing coupon, including at least one of: editing location information of the coupon, editing merchant information of the coupon, editing a start date and an end date of the coupon, editing a header of the coupon, editing a description of the coupon, uploading an image of the coupon, and uploading an image of the scannable code of the coupon; and
submit a payment for an existing coupon.

8. The coupon delivery system according to claim 1, wherein the arranging coupons with the assigned scannable codes into the list further comprises arranging the coupons with the assigned scannable codes based on at least one of: an alphabetical order of a merchants' name, an order of start dates of the coupons, an order of end dates of the coupons, a discount amount of the coupons, and a random arrangement.

9. The coupon delivery system according to claim 1, wherein the scannable codes are bar codes or QR codes and the first scannable code is a fixed universal scannable code, and wherein the public electronic display is a public kiosk reachable to the users.

10. The coupon delivery system of claim 1, further comprising the user device on which the scanning of the first scannable code causes the browser of the user device to navigate to the webpage to display on the user device the list of different merchants together with the number of available coupons of each merchant of the list of different merchants.

11. A coupon delivery method, comprises:
managing, by a server, coupons for displaying to users;
providing, by the server, a first user interface for an administrator of the system allow the administrator to manage merchants of the system;
providing, by the server, a second user interface for the merchants to customize coupons to be provided by the merchants;
assigning, by the server, a respective scannable code for each coupon provided by the merchants;
arranging, by the server, coupons with assigned scannable codes in to a list;
transmitting, by the server, the list of coupons with the assigned scannable codes for display on a public electronic display to a user device;
providing, by the server, a first scannable code of the assigned scannable codes configured to be scanned by the user device;
receiving, by the public electronic display, the list of coupons with the assigned scannable codes from the server;
displaying, by a first display of the public electronic display, the list of coupons and the assigned scannable codes, including the first scannable code, transmitted by the server with the list of coupons;
scanning, by the user device, the first scannable code, which demarcates one merchant of a list of different merchants on the first display, wherein the first scannable code is configured to redirect a browser of the user device to a webpage showing the list of different merchants together with a number of available coupons of each merchant of the list of different merchants when the first scannable code is scanned by the user device; and
redirecting, by the user device, the browser of the user device to the webpage showing the list of different merchants together with the number of available coupons of each merchant of the list of different merchants in response to said scanning of the first scannable code,
wherein each merchant on the list of different merchants on the webpage is configured to be selected by a user of the user device and cause the browser to display at least one available coupon of a selected merchant with at least one second scannable code on the user device when selected by the user of the user device;
wherein the at least one second scannable code is configured to be scanned at a point of sale of the selected merchant for automatically applying a discount to a purchase of the user.

12. The coupon delivery method according to claim 11, wherein the first user interface allows the administrator to add a new merchant, delete an existing merchant, edit merchant information of a merchant, manage coupons provided by a merchant, issue a login credential of a merchant, issue invoices to a merchant, and receive payment from a merchant.

13. The coupon delivery method according to claim 12, wherein the second user interface authenticates each merchant login with login credentials issued by the first user interface.

14. The coupon delivery method according to claim 11, wherein the second user interface further allows a merchant to add a coupon, including at least one of: setting location information of the coupon, setting merchant information of the coupon, designating a start date and an end date of the coupon, setting a header of the coupon, setting a description of the coupon, uploading an image of the coupon, and uploading an image of the scannable code of the coupon.

15. The coupon delivery method according to claim 14, further comprising a function to automatically generate and assign a coupon identification (ID) for each coupon added into the system.

16. The coupon delivery method according to claim 11, wherein the second user interface allows a merchant to:
search for an existing coupon based on the location information of the coupon, merchant information of the coupon, and a coupon identification (ID) of the coupon;
edit an existing coupon, including at least one of: editing location information of the coupon, editing merchant information of the coupon, editing a start date and an end date of the coupon, editing a header of the coupon, editing a description of the coupon, uploading an image of the coupon, and uploading an image of the scannable code of the coupon; and
submit a payment for an existing coupon.

17. The coupon delivery method according to claim 11, wherein the arranging coupons with the assigned scannable codes into the list further comprises arranging the coupons with the assigned scannable codes based on at least one of: an alphabetical order of a merchants' name, an order of start dates of the coupons, an order of end dates of the coupons, a discount amount of the coupons, and a random round robin fashion.

18. The coupon delivery method according to claim 11, wherein the scannable codes are bar codes or QR codes, and wherein the public electronic display is a public kiosk reachable to the users.

19. A coupon delivery system, comprising:
a server to manage coupons for displaying to users, wherein the server includes a processor and a memory, wherein the memory stores computer instructions, and when the computer instructions are executed by the processor, cause the server to perform following functions:
providing a first user interface for an administrator of the system to allow the administrator to manage merchants of the system;
providing a second user interface for the merchants to customize coupons to be provided by the merchants, wherein the second user interface allows a given merchant of the merchants to:
search for an existing coupon based on location information of the existing coupon, merchant information of the existing coupon, and a coupon identification (ID) of the existing coupon;
edit the existing coupon, including at least one of: editing the location information of the existing coupon, editing the merchant information of the existing coupon, editing a start date and an end date of the existing coupon, editing a header of the existing coupon, editing a description of the existing coupon, uploading an image of the existing coupon, and uploading an image of a scannable code of the existing coupon; and
submit a payment for the existing coupon;
assigning a respective scannable code for each coupon provided by the merchants;
arranging coupons with the assigned scannable codes in-to a list;
displaying the list of coupons with the assigned scannable codes on a display or transmitting the list of coupons with the assigned scannable codes for display to a cloud server; and
providing a first scannable code of the assigned scannable codes configured to be scanned by a user device;
wherein the first scannable code, which demarcates one merchant of a list of different merchants on the display, is configured to redirect a browser of the user device to a webpage showing the list of different merchants together with a number of available coupons of each merchant of the list of different merchants when the first scannable code is scanned by the user device;
wherein each merchant on the list of different merchants on the webpage is configured to be selected by a user of the user device and cause the browser to display at least one available coupon of a selected merchant with at least one second scannable code on the user device when selected by the user of the user device; and
wherein the at least one second scannable code is configured to be scanned at a point of sale of the selected merchant, and when the at least one second scannable code is scanned at the point of sale of the selected merchant, a discount to a purchase of the user is automatically applied and inventory of purchased goods or services is automatically deducted.

20. The coupon delivery system of claim 19, further comprising the user device on which scanning of the first scannable code causes the browser of the user device to navigate to the webpage showing the list of different merchants together with the number of available coupons of each merchant of the list of different merchants.

\* \* \* \* \*